(No Model.)

W. F. BERNSTEIN.
CASTER.

No. 544,878. Patented Aug. 20, 1895.

WITNESSES:
O. H. Nagle.
L. Douville.

INVENTOR
William F. Bernstein
BY John A. Biedenheim,
ATTORNEY.

UNITED STATES PATENT OFFICE.

WILLIAM F. BERNSTEIN, OF PHILADELPHIA, PENNSYLVANIA.

CASTER.

SPECIFICATION forming part of Letters Patent No. 544,878, dated August 20, 1895.

Application filed August 11, 1894. Serial No. 520,020. (No model.)

*To all whom it may concern:*

Be it known that I, WILLIAM F. BERNSTEIN, a citizen of the United States, residing in the city and county of Philadelphia, State of Pennsylvania, have invented a new and useful Improvement in Caster-Rollers, which improvement is fully set forth in the following specification and accompanying drawings.

My invention consists of a caster-roller formed of a metallic plug; a bushing tightly occupying a vertical opening in said plug, a spindle mounted in said bushing and having a head which is rotatable on the upper edge of said bushing, and ears or arms which carry the roller proper and are secured to said spindle; said bushing being made of material superior to that of the plug and forming the bearings of said spindle, the same being more durable than if provided by the plug, while the top of the opening in the plug prevents upward thrust of the spindle and serves as a bearing for the upper side of the head of the spindle, especially when the parts wear off, it being noticed that the bushing is primarily forcibly driven into the plug so that the spindle is held in the plug without the employment of screws or nails, while the plug is formed to be connected with a socket on the lower part of the leg to which the roller is applied.

Figure 1:
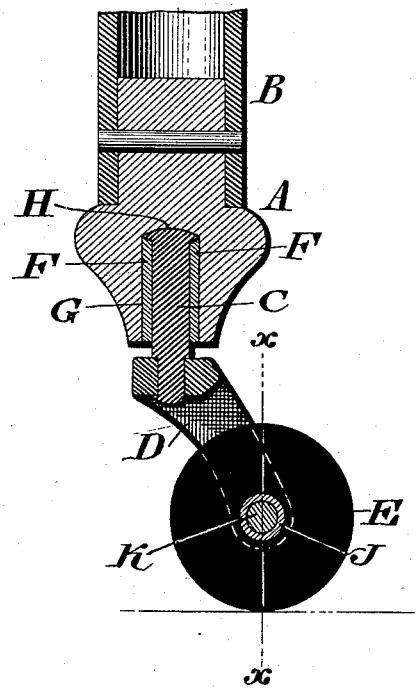
Figure 2:
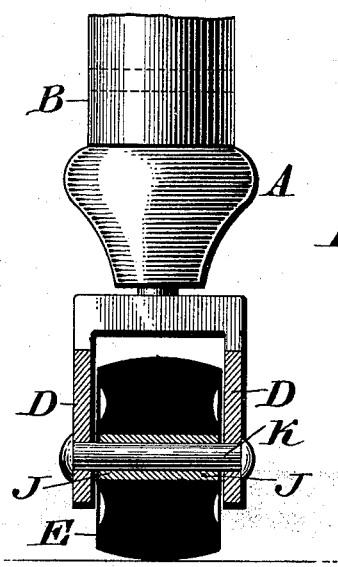

Figure 1 represents a vertical section of a caster-roller embodying my invention. Fig. 2 represents a partial side elevation and partial vertical section thereof, the section being on line $x$ $x$, Fig. 1.

Similar letters of reference indicate corresponding parts in the two figures.

Referring to the drawings, A designates a plug, which is adapted to be secured in the socket B on the lower end of the leg of a piece of furniture or other article which it is desired to provide with a caster-roller.

C designates the spindle to which the arms D of the roller E proper are secured, said spindle being freely fitted in the bushing F, which occupies a vertical opening G in the plug A and is held rigidly by the wall thereof. The upper end of the spindle has a head H thereon, the same bearing against the adjacent edge of the bushing, whereby the spindle is connected with the bushing and prevented from downward or outward displacement therefrom, it being evident that the head H rotates on the edge of the bushing, and the body of the spindle rotates within the body of said bushing, and thus the spindle is firmly and uniformly sustained in its rotations by the bushing. Furthermore, as the bushing is tightly hugged by the wall of the opening G, it being driven thereinto, the spindle remains tightly connected with the plug, and is prevented from breaking out of the same, it being noticed that neither nails nor screws are employed to retain said spindle in place. Furthermore, the upward thrust or pressure on the spindle is resisted by the top wall of the opening in the plug receiving said spindle, and the bushing and the head H of said spindle may have a bearing on said wall, thus preventing any lateral strain or twisting of the spindle. The central opening of the roller E has a bushing J therein, the same being firmly secured to the wall of said opening and receiving the axial pin K of the roller, so that the bushing which is fixed to the roller rotates on said pin, and the roller is accordingly strengthened and stiffened about the center thereof and it possesses greater or better wearing qualities on its axis.

I am aware that the spindle of a caster-roller has been mounted in a cup rising from a base-plate, the latter being screwed to the bottom of a furniture-leg, and said cup occupying the wood of said leg, and therefore disclaim such feature. By my construction the base-plate and screws are dispensed with; the spindle rotates in a bushing without liability of the parts to wear out rapidly, and a metallic plug is proposed for hugging or tightly embracing said bushing and forming a stop for the upward thrust of the spindle and a bearing for the head of the latter.

Having thus described my invention, what I claim as new, and desire to secure by Letters Patent, is—

The metal plug A provided with means for attachment to an article of furniture, &c., and having a vertical opening therein, in combination with the headed rotatable spindle C, and the stationary bushing F both occupying said opening, said bushing freely embracing said spindle and the latter forcibly hugging the wall of said opening, substantially as described.

WILLIAM F. BERNSTEIN.

Witnesses:
 JOHN A. WIEDERSHEIM,
 R. H. GRAESER.